United States Patent
Tran et al.

(10) Patent No.: US 9,488,864 B2
(45) Date of Patent: Nov. 8, 2016

(54) LIGHT DISTRIBUTING OPTICAL COMPONENT

(71) Applicant: Radiant Choice Limited, Victoria, Mahe (SC)

(72) Inventors: Nguyen The Tran, Garden Grove, CA (US); Jiun-Pyng You, Costa Mesa, CA (US)

(73) Assignee: Radiant Choice Limited, Victoria, Mahe (SC)

( * ) Notice: Subject to any disclaimer, the term of this patent is extended or adjusted under 35 U.S.C. 154(b) by 0 days.

(21) Appl. No.: 14/694,866

(22) Filed: Apr. 23, 2015

(65) Prior Publication Data

US 2015/0378215 A1 Dec. 31, 2015

Related U.S. Application Data

(60) Provisional application No. 62/018,603, filed on Jun. 28, 2014.

(51) Int. Cl.

| | |
|---|---|
| G09F 13/04 | (2006.01) |
| G02F 1/1335 | (2006.01) |
| F21V 5/04 | (2006.01) |
| F21V 5/02 | (2006.01) |
| G02B 17/00 | (2006.01) |
| F21V 5/00 | (2015.01) |
| G02B 5/02 | (2006.01) |

(52) U.S. Cl.
CPC ........... *G02F 1/133606* (2013.01); *F21V 5/02* (2013.01); *F21V 5/04* (2013.01); *G02B 17/00* (2013.01); *G02F 1/133603* (2013.01); *F21V 5/008* (2013.01); *G02B 5/0215* (2013.01); *G02B 5/0221* (2013.01); *G02B 5/0231* (2013.01); *G02F 2001/133607* (2013.01)

(58) Field of Classification Search
CPC ............ F21V 5/02; F21V 5/04; F21V 5/046; F21V 5/008; G02F 2001/133607; G02F 1/133603; G02B 5/0215; G02B 5/0221; G02B 5/0231
USPC ............... 362/311.01, 311.02, 311.09, 311.1, 362/311.14, 311.15, 335
See application file for complete search history.

(56) References Cited

U.S. PATENT DOCUMENTS

| | | | |
|---|---|---|---|
| 6,582,103 B1 | 6/2003 | Popovich et al. | |
| 6,679,621 B2 | 1/2004 | West et al. | |
| 7,254,309 B1 | 8/2007 | Chou et al. | |
| 7,414,270 B2 | 8/2008 | Kim et al. | |
| 7,621,657 B2 | 11/2009 | Ohkawa | |
| 7,837,370 B2 | 11/2010 | Bierhuizen et al. | |
| 8,042,965 B2 | 10/2011 | Peng et al. | |
| 8,227,969 B2 | 7/2012 | Yamaguchi et al. | |
| 8,596,829 B2 | 12/2013 | Yamaguchi | |
| 2007/0258247 A1* | 11/2007 | Park | G02B 5/0231 362/326 |
| 2011/0222294 A1 | 9/2011 | Fan et al. | |
| 2014/0168970 A1 | 6/2014 | Choi et al. | |
| 2014/0204563 A1 | 7/2014 | Nguyen et al. | |
| 2015/0043222 A1* | 2/2015 | Jiang | F21V 5/04 362/327 |
| 2015/0117021 A1* | 4/2015 | Chinniah | F21V 3/00 362/335 |
| 2015/0378214 A1 | 12/2015 | Tran et al. | |

* cited by examiner

*Primary Examiner* — Y M Lee
(74) *Attorney, Agent, or Firm* — Knobbe Martens Olson & Bear LLP

(57) ABSTRACT

The present disclosure includes an optical component including one or more textured surfaces configured to diffuse light incident thereto from within the optical component. The optical component includes textured surfaces at least along a top periphery of its body.

20 Claims, 7 Drawing Sheets

LIGHT DISTRIBUTING OPTICAL COMPONENT

CROSS-REFERENCE TO RELATED APPLICATIONS

The present application claims benefit under 35 U.S.C. §119(e) of U.S. Provisional Application No. 62/018,603, filed on Jun. 28, 2014 and titled "Optical Lens for Distributing Light." The disclosure of the above identified provisional patent application is incorporated by reference herein in its entirety.

BACKGROUND

1. Field

The present disclosure generally relates optical components that redistribute light emitted from a light source and, in particular, for use with a light emitting diode.

2. Background

In many applications that use light emitting diode (LED) emitters as light sources, optical components, such as, for example, lenses, diffusers, reflectors, redirectors, etc. can be used to tailor the radiation pattern of the light emitted from the LED. In various implementations, a light source can include an array of LEDs. In such implementations, an array of optical components can be disposed over the array of LEDs such that each optical component in the array of optical components surrounds a corresponding LED in the array of LEDs to illuminate a large area of interest.

Recently, there is a demand for illumination panels that have a slim/thin profile and include fewer LEDs to reduce cost. Optical components that can achieve a desired luminance over an area with fewer LEDs can advantageously provide illumination panels with thin profile at a low cost.

Slim illumination panels utilizing white LEDs can also suffer from color non-uniformity. Accordingly, it is desirable to provide optical components that can mix different wavelengths of light emitted from multicolored and/or white LEDs in order to reduce color non-uniformity. The foregoing discussion in this section is to provide background to the subject matter disclosed herein and does not constitute an admission of prior art.

SUMMARY

The systems, methods and devices of this disclosure each have several innovative aspects, no single one of which is solely responsible for the desirable attributes disclosed herein.

Various embodiments described herein comprise an optical component that can be used to spread light from a LED emitter over a larger angular range. The embodiments of the optical component described herein can be used to uniformly distribute light from a LED emitter over a desired area of illumination such that the radiation pattern over illumination area does not have regions where the light intensity dips below a threshold and increases again. Accordingly, the illuminance can vary smoothly and/or monotonically over the illumination area. For example, the illuminance over the illumination area can have a Gaussian or a Lambertian distribution. In various implementations, the optical component can include one or more textured surfaces that can redistribute light output from the LED emitter across an illumination surface disposed at an optical distance between about 10-30 mm from the LED emitter, such that a variation of the luminous flux incident per unit area of the illumination surface is monotonic. In various implementations, the textured surfaces can include a plurality of microstructures. The plurality of microstructures can include grooves, protrusions, facets, surface or volume holograms, etc. The plurality of microstructures can arranged to form a pattern or can be arranged randomly.

Various embodiments described herein comprise an illumination device comprising a LED emitter and an optical component disposed over the LED and configured to spread the light emitted from the LED emitter uniformly and/or monotonically over an illumination panel such that the illuminance varies smoothly across the panel. Accordingly, the distribution of light across the panel does not have any regions where the light intensity dips below a threshold and increases again. The LED emitter and the optical component can be configured such that uniform and/or monotonic light distribution is achieved even when the LED is disposed at a distance less than or equal to about 25 mm (e.g., 15-18 mm) from the illumination panel. In various implementations, a reflector and/or a printed circuit board (PCB) can be integrated with a base of the optical component. The printed circuit board can be reflective. The reflectivity of the reflector and/or the PCB can affect the intensity of light in the region of the illumination surface directly overhead the optical component. Accordingly, the intensity of light across the illumination surface can be tailored by adjusting the reflectivity of the reflector and/or PCB integrated with the optical component. Various implementations described herein can be used for backlighting in direct type or direct-lit display and liquid crystal display applications and for panel lighting applications. Various implementations of the illumination device can be included in a backlight with a thin profile or a slim profile architectural lighting panel.

One innovative aspect of the subject matter described in this disclosure can be implemented in an optical apparatus for use with a light source comprising at least one light emitting diode (LED). The apparatus comprises a single-piece, light-transmitting body comprising a top, a bottom and a side interconnecting the top and the bottom, wherein an imaginary central axis of the body passes through the top and the bottom and does not pass through the side. The apparatus further comprises at least one top curved surface formed on the top of the body; a bottom cavity formed into the body in a central portion of the bottom such that the central axis passes through the bottom cavity; and a top textured surface formed along a periphery of the at least one top curved surface when viewed from the top along the central axis. The bottom cavity is arranged relative to the light source such that the light source is placed under the bottom cavity and the central axis passes through the top, the bottom cavity and the light source. The top textured surface comprises microstructures configured to diffuse light beams incident thereto from within the body.

In various implementations, the top textured surface can be generally raised with reference to the at least one top curved surface. The at least one top curved surface need not comprise microstructures configured to diffuse light beams that are incident thereto from within the body. In various implementations, the at least one top curved surface can be recessed relative to the top textured surface while the at least one top curved surface can be convexed in a cross section taken along a plane parallel to the central axis. In various implementations, the apparatus can comprise a side textured surface formed on the side next to the top textured surface and can comprise microstructures configured to diffuse light beams incident thereto from within the body. The top textured surface and the side textured surface can be configured to have a distinct boundary therebetween or continuously formed without a distinct boundary therebetween. In various implementations, when not considering the microstructures, the top textured surface can comprise a portion generally facing away from the bottom cavity in a direction along the central axis. In various implementations, when not considering the microstructures, the side textured surface can comprise a portion generally facing away from the bottom cavity in radial directions from the central axis.

The side textured surface immediately next to the top textured surface can be referred to as a first side textured surface. The apparatus can further comprise a second side textured surface formed on the side that is separated from the first side textured surface by a non-textured surface that does not comprise microstructures for diffusing light beams incident thereto from within the body. The height of the body can be from about 5 mm to about 10 mm and the top textured surface can be located at a distance between about 6 mm to about 10 mm from the central axis along a radial direction. The side textured surface next to the top textured surface can be referred to as a first side textured surface. The apparatus can further comprise a second side textured surface formed on the side that is separated from the first side textured surface with a non-textured surface that does not comprise microstructures for diffusing light beams incident thereto from within the body.

The second side textured surface can comprise a portion generally facing away from the bottom cavity in a direction along the central axis. In various implementations, when not considering the microstructures, the side textured surface can comprise a portion generally facing away from the bottom cavity along a radial direction from the central axis.

The at least one top curved surface can be curved such that its curvature is generally radially symmetrical about the central axis. The top textured surface can surround the at least one top curved surface when viewed from the top along the central axis. The microstructures of the top textured surface can be configured to direct incident light beams from within the body to directions that would not be possible if the top textured surface was flat or curved without the microstructures.

The microstructures of the top textured surface can comprise a first microstructure that provides a plurality of micro-surfaces having different tangential planes, which can allow two or more parallel light beams incident to the first microstructure to reach different micro-surfaces of the first microstructure such that the two or more parallel light beams leave the first microstructure in different directions. All or part of the plurality of micro-surfaces can be continuously curved with or discretely separated from their immediately neighboring micro-surfaces.

The at least one top curved surface can be curved such that a substantial portion of light beams from the light source that are received through the bottom cavity and incident to the at least one top curved surface without any prior reflection inside the body is subject to total internal reflection on the at least one top curved surface.

In implementations, when the light source is placed under the bottom cavity and the central axis passes through the light source along with the top and bottom cavity, the apparatus is configured to provide illumination characteristics that at an optical distance in a range of 10-30 mm, illuminance via the apparatus within a distance of 25 mm from the central axis is equal to or greater than 75% of the maximum illuminance.

In implementations, when the light source is placed under the bottom cavity and the central axis passes through the light source along with the top and bottom cavity, the apparatus is configured to provide illumination characteristics that at an optical distance in a range of 10-30 mm, illuminance within a distance of 50 mm from the central axis is not less than 50% of the maximum illuminance.

The apparatus can be incorporated in an illumination device comprising at least one light emitting diode (LED). The light source can be arranged relative to the apparatus such that the central axis passes through the light source and light beams emitted from the light source are at least in part directed to the bottom cavity without reflection before reaching the bottom cavity. The illumination device can have illumination characteristics that at an optical distance in a range of 10-30 mm, illuminance within a distance of 25 mm from the central axis is equal to or greater than 75% of the maximum illuminance. The illumination device can have illumination characteristics that at an optical distance in a range of 10-30 mm, illuminance within a distance of 50 mm from the central axis is not less than 50% of the maximum illuminance.

A plurality of the illumination devices described above can be included in an illumination system. The plurality of illumination devices can be aligned to form a linear arrangement or an array. The illumination system can be incorporated in a back lighting unit which can be incorporated in an LCD display panel. The LCD display panel can be incorporated in a consumer electronic device.

One innovative aspect of the subject matter described in this disclosure can be implemented in an illumination device comprising a light source comprising a light emitting diode (LED) including an emitting surface and an optical component disposed over the LED. The optical component comprises an inner surface and an outer surface. The outer surface includes a base region; an outer top region opposite the base region; an outer side region connecting the base region and the top region; and at least one textured structure. The optical component is disposed around light source such that the inner surface surrounds the LED. The optical component is configured to redistribute light emitted from the LED in an angular extent $\Delta\theta_1$ with respect to a normal to the emitting surface over a wider angular extent $\Delta\theta_2$ with respect to the normal to the emitting surface such that illuminance varies monotonically about the normal to the emitting surface over the angular extent $\Delta\theta_2$. The textured structure can include a plurality of microstructures. For example, the illuminance profile achieved can be such that the illuminance does not decrease below a threshold illuminance in any region over the angular extent $\Delta\theta_2$. The textured structure can include a microstructured ring disposed about a periphery of the outer top region. The textured structure can include a microstructured ring disposed about a periphery of the base region. The textured structure can be configured to diffuse light emitted from the LED in an annular region having an angular extent $\Delta\theta_{dark}$. In various implementations, the device can comprise a reflector disposed adjacent the bottom surface of the optical component. The reflector can comprise a plurality of microstructures. The reflector can have a reflectivity configured to reduce variation in the correlated color temperature, illuminance and/or intensity of the output light.

Various implementations of the illumination device can further comprise a bottom panel and a top panel, wherein the LED is disposed on the bottom panel and light emitted from the optical component is incident on the top panel. A distance between the bottom panel and the top panel can be less than about 25 mm. Various implementations of the illumination device can further comprise a scattering component disposed on the bottom panel such that a portion of light emitted from the outer top region is scattered by the scattering component toward the top panel. Various implementations of the illumination device can be configured as a backlight for a display device. Various implementations of the illumination device can be configured as an architectural lighting.

One innovative aspect of the subject matter described in this disclosure can be implemented in an optical component comprising a top curved surface disposed about a central axis; a textured structure disposed along a periphery of the top curved surface, the textured structure comprising an upper surface having an upper surface normal parallel to the central axis and a lateral surface having a lateral surface normal perpendicular to the central axis; a bottom surface opposite the top surface, the bottom surface including an opening defining an inner cavity that extends toward the top surface through the optical component, the inner cavity bounded by an inner side surface and an inner top surface; and a side surface extending between the top surface and the bottom surface. The upper surface of the textured structure can include a first plurality of microstructures configured to diffuse light incident from the inner cavity in a first area disposed around the upper surface normal. The first area can correspond to an annular region. The first plurality of microstructures can be arranged randomly or to form a pattern. The lateral surface of the textured structure can include a second plurality of microstructures configured to diffuse light incident from the inner cavity in a second area disposed around the lateral surface normal. The second plurality of microstructures can be arranged randomly or to form a pattern. A portion of the side surface can include a third plurality of microstructures configured to diffuse light incident from the inner cavity. The optical component can be configured to distribute light incident from the inner cavity over an illumination surface such that distribution of light intensity across the illumination surface does not fall below a threshold for a range of output angles. For example, within a distance of about 10 mm from the central axis, the illuminance does not fall below 75% of the maximum illuminance. As another example, within a distance of about 50 mm from the central axis, the illuminance does not fall below 50% of the maximum illuminance. The illumination surface can be disposed at a distance less than 25 mm from the bottom surface.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
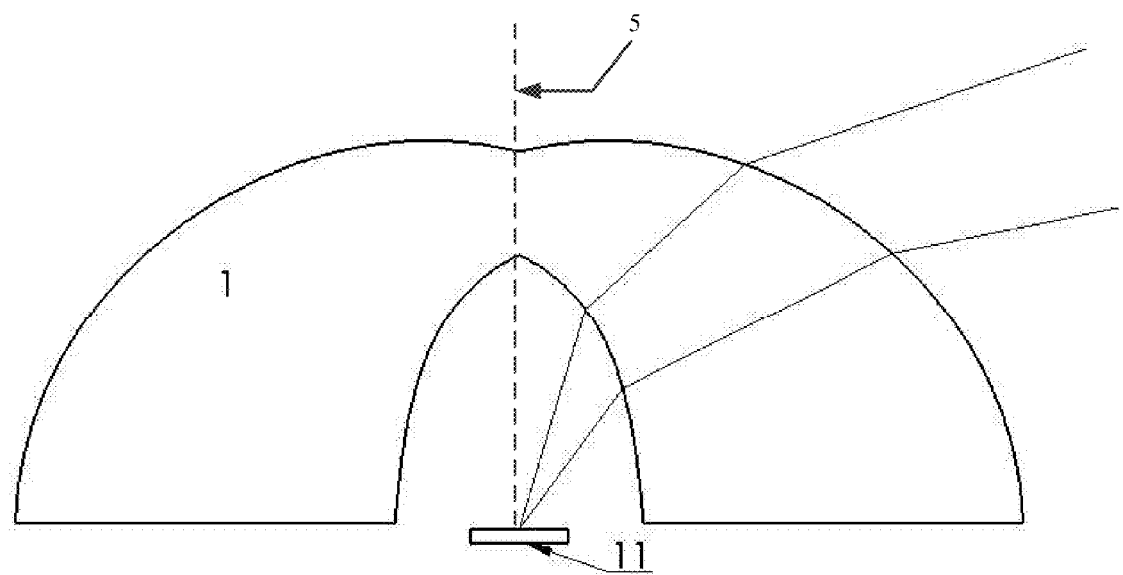
FIG. 1 illustrates a cross-section view of an optical component configured to spread light emitted from a surface-emitting LED emitter using refraction.

The following detailed description is directed to certain implementations for the purposes of describing the innovative aspects. However, the teachings herein can be applied in a multitude of different ways. As will be apparent from the following description, the innovative aspects may be implemented in any device that is configured to provide illumination. More particularly, it is contemplated that the innovative aspects may be implemented in illumination systems, such as, a thin backlight and/or a frontlight unit configured to provide illumination to various display devices, such as, for example liquid crystal based display devices or LED based display devices. The described implementations may be incorporated in any device, apparatus, or system that can be configured to display moving images, such as video, still images, such as photographs, text, graphics, and/or pictures. More particularly, it is contemplated that the described implementations may be included in or associated with a variety of electronic devices such as, but not limited to: mobile telephones, smart phones, multimedia Internet enabled cellular telephones, mobile television receivers, wireless devices, Bluetooth® devices, personal data assistants (PDAs), wireless electronic mail receivers, hand-held or portable computers, tablets, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, washers, dryers, washer/dryers, parking meters, billboards, signage, etc. Additionally, innovative aspects may be implemented in thin illumination systems and/or luminaires for commercial and/or residential lighting applications. For example, the embodiments described herein can be configured as slim profile lighting devices that can be incorporated in or used as a building material, such as, for example, walls, floors, ceilings of residential and commercial structures. Other uses are also possible.

Various embodiments of an optical component are described herein with reference to the accompanying figures. The terminology used in the description presented herein is not intended to be interpreted in any limited or restrictive manner, simply because it is being utilized in conjunction with a detailed description of certain specific embodiments. Furthermore, various embodiments of the optical component described herein can comprise several features, no single one of which is solely responsible for its desirable attributes or which is essential to achieve the light distribution profiles described herein.

The terms bottom, top and side are used in the present disclosure to designate or identify certain features described in the various implementations. However, these terms are only used to define relative positions of such features and should not be interpreted as carrying any meaning other than the relativity of positions of features reciting these terms.

Various embodiments of an optical component described herein can be configured to redistribute light emitted from a LED emitter. For example, the implementations of the optical component described herein can be configured to spread light emitted from the LED emitter over a wider angular range. Furthermore, the implementations of the optical component described herein can also be used to mix different wavelengths of light emitted from the LED emitter such that a high degree of color uniformity is achieved. Additionally, the implementations of the optical component described herein can also be configured to redistribute the light emitted from the LED emitter uniformly and/or monotonically over an area of illumination such that light intensity is constant or varies monotonically across the illumination area. Without any loss of generality, monotonic variation of light intensity (or illuminance) can refer to an intensity (or an illuminance) distribution, wherein the light intensity (or illuminance) in a region does not fall below a threshold intensity (or illuminance) value. The threshold intensity (or illuminance) value can be determined based on the distance of the region from the LED emitter and/or a number of LED emitters. For example, an intensity (or an illuminance) distribution can be referred to as a monotonic intensity (or illuminance) distribution if the variation of the intensity (or the illuminance) in a region is no more than 1-15% of the maximum intensity in that region. In various implementations, the optical component can be configured to redistribute light emitted from the LED emitter such that intensity of the redistributed light has a Gaussian or a Lambertian profile. The optical component can be configured to redistribute light emitted from the LED emitter across an illumination surface disposed at a distance between about 10-30 mm from the LED emitter such that the illuminance in a region of the illumination surface disposed about a point where the central axis of the optical component intersects the illumination surface and having an area less than or equal to about 320 square mm ($mm^2$) is greater than or equal to about 75% of the maximum illuminance in the region, when an area about the point where the central axis of the optical component intersects the illumination surface where the illuminance from a single LED coupled to the optical component falls to about 50% of the maximum illuminance is at least about 80 square cm ($cm^2$). The optical component can be configured to redistribute light emitted from the LED emitter across an illumination surface disposed at a distance between about 10-30 mm from the LED emitter such that the illuminance at a distance less than a threshold distance from a point where the central axis of the optical component intersects the illumination surface is greater than or equal to 75% (e.g., greater than or equal to about 80%, greater than or equal to about 85%, greater than or equal to about 90%, greater than or equal to about 95%, greater than or equal to about 99%) of the maximum illuminance on the illumination surface. In various implementations the threshold distance can have a value between about 5-30 mm. For example the threshold distance can be between about 5 mm and about 30 mm, between about 10 mm and about 25 mm, between about 15 mm and about 20 mm, between about 10 mm and about 30 mm, or values there between.

Various implementations described herein include a light bar including a plurality of LED emitters, each LED emitter associated with an optical component configured to tailor the radiation pattern of light emitted from the LED emitter to a desired radiation pattern. For example, the optical component associated with each LED emitter may be configured to spread the light emitted from the LED uniformly and/or monotonically and/or mix the different wavelengths emitted from the LED to reduce color non-uniformity.

LED Emitter

A light emitting diode (LED) is a semiconductor device that emits light in ultraviolet, visible and/or infrared wavelengths. Recent advances in semiconductor technology has led to the development of LEDs with high luminous efficacy that can generate light having the same amount of luminous flux as a standard 60 W or 100 W incandescent or fluorescent bulb with no more than 1 W of electrical power. LED emitters with high luminous efficacy can be miniaturized to have a size less than 10 mm such that they can be mounted on a printed circuit board (PCB) using semiconductor packaging techniques. The PCB can include driving circuits to supply required electrical current and voltage to the LED emitters. In various implementations, the PCB can also include heat sink and/or thermo-coolers to cool the LED emitters. Accordingly, a thin array of LED emitters that can provide a large amount of luminous flux using a small amount of electrical power can be manufactured. Such thin arrays of LED emitters are in great demand for a variety of display applications and/or lighting applications.

Early LED emitters primarily emitted light in the red and/or the infrared spectral range. However, recent developments in semiconductor technology have led to the development of LED emitters that can emit light in different regions of the ultraviolet (UV), visible and infrared (IR) spectrum. For example, LED emitters that can emit in the blue and violet regions of the visible spectrum have been developed recently. LED emitters that emit white light have also been developed. White LED (WLED) emitters can be realized in one of two ways. One method of producing a WLED emitter is to use LED emitters that emit contrasting colors and mix the contrasting colors. For example, a WLED emitter can include a cyan LED emitter and a yellow LED emitter such that light output from the cyan LED emitter and the yellow LED emitter are mixed to produce white light. As another example, a WLED emitter can include a red LED emitter, a green LED emitter and a blue LED emitter such that light output from the red, green and blue LED emitters can be mixed to produce white light. Another method of producing a WLED emitter is to use phosphor material that absorbs radiation and emits a white light. For example, a WLED emitted can include a RGB phosphor and a near-UV or a UV LED. The RGB phosphor can absorb the radiation from the near-UV or UV LED and emit a broad spectrum white light. As another example, a WLED emitted can include a yellow phosphor and a blue LED. The yellow phosphor can absorb the radiation from the blue LED and emit a broad spectrum white light.

LED emitters are desirable in backlights and frontlights for display devices as well as in lighting applications due to their high luminous efficacy, long lifetimes, low manufacturing cost and miniaturization capabilities.

LED emitters can generally be divided into two classes: side-emitting-emitters and top-emitting-emitters. In top-emitting LED emitters, light is emitted along a direction perpendicular to the surface of the LED emitter. In side-emitting LED emitters, light is emitted along a direction parallel to the surface of the LED. Most top-emitting LED emitters exhibit a Lambertian emission pattern, where the intensity profile is proportional to the cosine of the emission angle, which is measured from a normal to the surface of the LED emitter. Most side-emitting LED emitters emit light from a region along a long edge surface of the LED emitter. Light from side-emitting LED emitters is usually emitted in a complex pattern and can be non-symmetrical.

LED emitters usually emit light from a small area. For example, the emission area can be less than 1-2 mm². Accordingly, the beam angle of light emitted from a LED emitter can be small. Thus, optical components that can reflect, refract collimate, focus, diffuse and/or diffract light are integrated with the LED emitter to tailor the pattern of radiation emitted from the LED emitter.

FIG. 1 illustrates a cross-section view of an implementation of an optical component 1 configured to spread light emitted from a LED emitter 11 configured as a top-emitting LED. The LED emitter has a central axis 5 that is normal to the surface of the LED emitter 11. In implementations of the optical component 1 having a circular cross-section, the central axis 5 can pass through the center of the circular cross-section. In various implementations of the optical component 1, the central axis 5 can pass through the centroid of the optical component 1. In various implementations of the optical component 1, the central axis 5 can pass through a geometric center of the optical component 1. The LED emitter 11 and the optical element 1 can be rotationally symmetric about the central axis 5. The surfaces of the optical component 1 are configured to refract light emitted from the surface of the surface-emitting LED emitter 11 and direct it in a wider angular range over an illumination surface disposed at a distance from the LED emitter. Accordingly, if the illumination surface were configured as a viewing surface, then light emitted from the surface-emitting LED emitter 11 is directed towards a larger viewing angle by this method.

Figure 2:
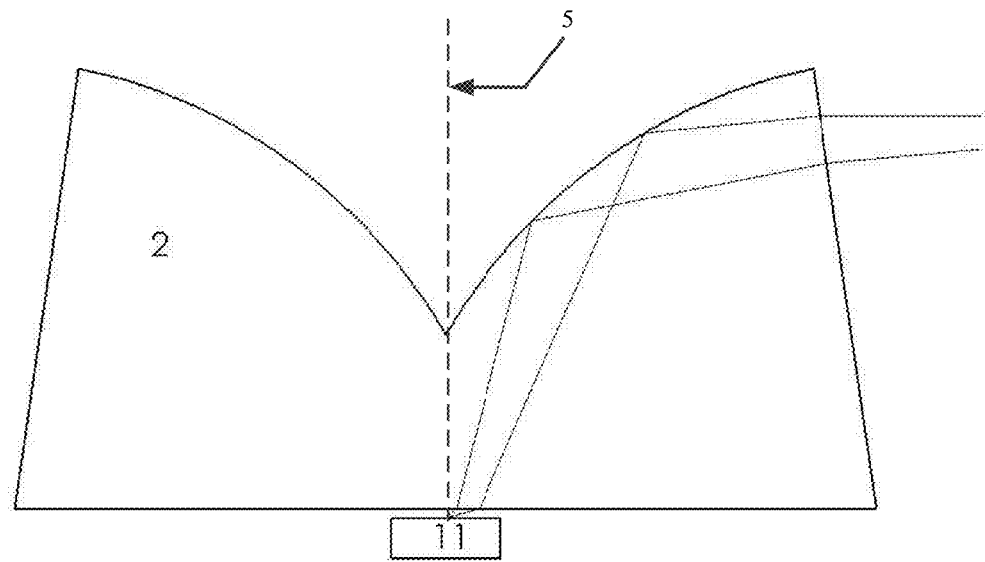
FIG. 2 illustrates a cross-section view of another optical component configured to spread light emitted from an edge-emitting LED.

FIG. 2 illustrates a cross-section view of another configuration of an optical component 2 configured to spread light emitted from a LED emitter 11 configured as a top-emitting LED. Similar to the configuration illustrated in FIG. 1, the LED emitter 11 and the optical element 2 can be symmetric about the central axis 5 that is normal to the surface of the LED emitter 11. In implementations of the optical component 2 having a circular cross-section, the central axis 5 can pass through the center of the circular cross-section. In various implementations of the optical component 2, the central axis 5 can pass through the centroid of the optical component 2. In various implementations of the optical component 2, the central axis 5 can pass through a geometric center of the optical component 2. Various implementations of the optical component 2 includes one or more specular reflecting surfaces, diffuse reflecting surfaces and/or total internal reflecting surfaces to collect light from all the edges of the edge-emitting LED. The light collected from all the sides of the top-emitting LED is refracted at one or more surfaces of the optical component 2 in order to enlarge the angular range of the emitted light over an illumination surface disposed at a distance from the LED emitter.

Conventional optical elements that are configured to collect light from LED emitters and direct them in a wider angular range may not capable of providing uniform and/or monotonic light distribution over the illumination surface when the distance between the LED emitter and the illumination surface is reduced. This is explained in further detail with respect to FIG. 3 which illustrates the illuminance (or luminous flux incident per unit area of an illumination surface) from a single LED over an illumination panel disposed at a distance from the LED achieved when the embodiment of the optical component illustrated in FIG. 2 is disposed over the single LED. In various implementations, the illumination panel can be disposed at a distance between about 15-20 mm or less from the LED. Without subscribing to any theory, as used herein, illuminance is a measure of the luminous flux incident per unit area of an illumination surface and can be correlated with the intensity of light incident per unit area of the illumination surface. In various implementations, the illuminance across the surface can be measured using a lux meter. As noted from FIG. 3, the illuminance has a peak when the direction along which light is emitted coincides with the central axis 5. The illuminance generally decreases as the angle between the direction along which light is emitted and the central axis 5 increases. It is further noted that the decrease in the illuminance with respect to increasing angle between the direction along which light is emitted and the central axis 5 is not monotonic. In fact, it is observed that the illuminance dips below a threshold for certain angles between the direction along which light is emitted and the central axis 5 and then increases. Accordingly, the illuminance is not uniform and/or monotonic across the illumination surface. In various embodiments, the dip in the illuminance at certain angles can result in dark regions in the illumination pattern generated by the LED emitter which may not be desirable.

Various implementations of optical components described herein include one or more textured light output surfaces that can uniformly redistribute light emitted from the LED emitter across an illumination surface disposed at an optical distance between about 10 mm and about 30 mm. The one or more textured light output surface can be configured such that the intensity of light at every 1 mm² region of the illumination surface in an area between about 5-350 mm² around a point where the central axis normal to the optical component intersects the illumination surface is not less than 75% of the maximum intensity on the illumination surface, where the illuminance from a single LED coupled to the optical component falls to about 50% of the maximum illuminance over an area that is at least about 80 square cm (cm²). For example, the intensity of light at every 1 mm² region of the illumination surface in an area between about 10-50 mm² around the point where the central axis normal to the optical component intersects the illumination surface is greater than 90% of the maximum intensity on the illumination surface, where the illuminance from a single LED coupled to the optical component falls to about 50% of the maximum illuminance over an area that is at least about 80 square cm (cm²). As another example, the intensity of light at every 1 mm² region of the illumination surface in an area between about 10-100 mm² around the point where the central axis normal to the optical component intersects the illumination surface is greater than 80% of the maximum intensity on the illumination surface, where the illuminance from a single LED coupled to the optical component falls to about 50% of the maximum illuminance over an area that is at least about 80 square cm (cm²). As yet another example, the intensity of light at every 1 mm² region of the illumination surface in an area between about 5-150 mm² around the point where the central axis normal to the optical component intersects the illumination surface is greater than 80% of the maximum intensity on the illumination surface, where the illuminance from a single LED coupled to the optical component falls to about 50% of the maximum illuminance over an area that is at least about 80 square cm (cm²). As another example, the intensity per unit area of the illumination surface in a region having an area between about 5-200 mm² around the point where the central axis normal to the optical component intersects the illumination surface is not less than 75% of the maximum intensity on the illumination surface, where the illuminance from a single LED coupled to the optical component falls to about 50% of the maximum illuminance over an area that is at least about 80 square cm (cm²). As another example, the intensity per unit area of the illumination surface in a region having an area between about 5-320 mm² around the point where the central axis normal to the optical component intersects the illumination surface is not less than 75% of the maximum intensity on the illumination surface, where the illuminance from a single LED coupled to the optical component falls to about 50% of the maximum illuminance over an area that is at least about 80 square cm (cm²).

The one or more textured light output surface can be configured such that the illuminance in a region located at a distance less than or equal to about 25 mm from a point where the central axis normal to the optical component intersects the illumination surface is greater than 75% of the maximum illuminance on the illumination surface, where the illuminance from a single LED coupled to the optical component falls to about 50% of the maximum illuminance over an area that is at least about 80 square cm (cm²). The one or more textured light output surface can be configured such that the illuminance in a region located at a distance less than or equal to about 20 mm from the point where the central axis normal to the optical component intersects the illumination surface is greater than 75% of the maximum illuminance on the illumination surface, where the illuminance from a single LED coupled to the optical component falls to about 50% of the maximum illuminance over an area that is at least about 80 square cm (cm²). The one or more textured light output surface can be configured such that the illuminance in a region located at a distance less than or equal to about 10 mm from the point where the central axis normal to the optical component intersects the illumination surface is greater than 80% of the maximum illuminance on the illumination surface, where the illuminance from a single LED coupled to the optical component falls to about 50% of the maximum illuminance over an area that is at least about 80 square cm (cm²). The one or more textured light output surface can be configured such that the illuminance in a region located at a distance between about 20 mm and about 50 mm from the point where the central axis normal to the optical component intersects the illumination surface is between about 50% and about 90% of the maximum illuminance on the illumination surface, where the illuminance from a single LED coupled to the optical component falls to about 50% of the maximum illuminance over an area that is at least about 80 square cm (cm²).

Various implementations of optical components described herein can be configured to be disposed over a LED emitter such that light emitted from the LED emitter is redistributed over an illumination surface disposed at an optical distance between about 10-30 mm from the LED emitter. The optical component can be configured to redistribute light from the LED emitter by redirecting light emitted from the LED emitter in a certain angular range to regions located away from the central axis of the optical component.

Conventional optical elements that are configured to collect light from WLED emitters may not be capable of mixing the different wavelengths of light efficiently which may result in color non-uniformity at the illumination surface and/or at the surface of the optical component. For example, average color temperature in a central portion of the illuminated region may be different than the average color temperature in a peripheral portion of the illuminated region. Moreover, the average color temperature in various portions of the illuminated region may be lower than the average color temperature of the LED emitter. Accordingly, it would be desirable to provide optical components that can spread light from LED emitters uniformly and/or monotonically and/or with higher degree of color non-uniformity.

The textured output surfaces of the various implementations of the optical component described herein can also improve color non-uniformity by providing color mixing function. In various implementations one or more light receiving surfaces of the optical component described herein can also be textured to further improve color non-uniformity.

Light Spreading Optical Component

Figure 4A:
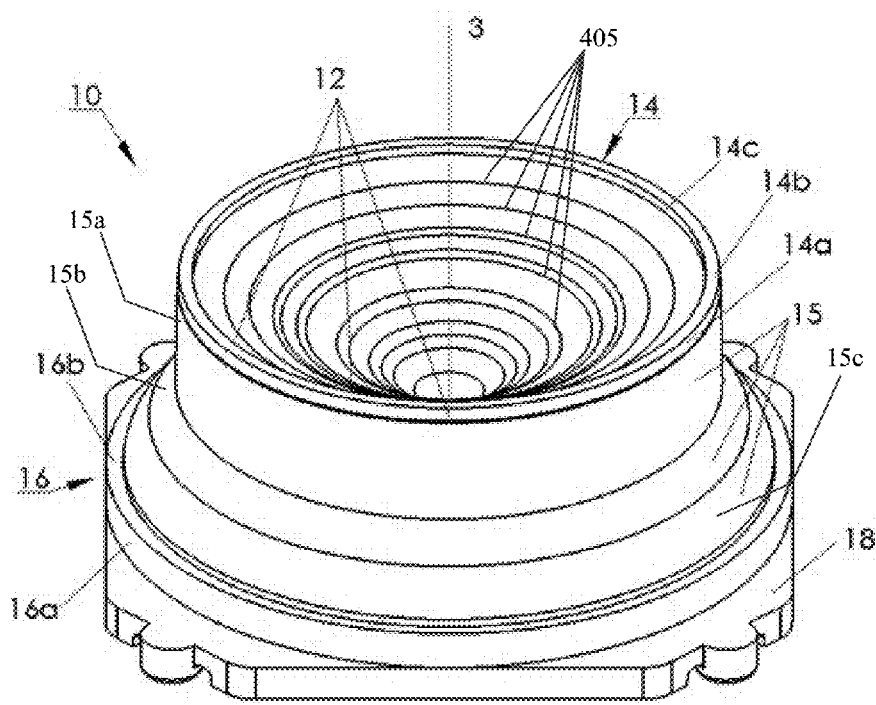
FIG. 4A illustrates a perspective view of an embodiment of an optical component configured to spread light across an illumination panel.
Figure 4B:
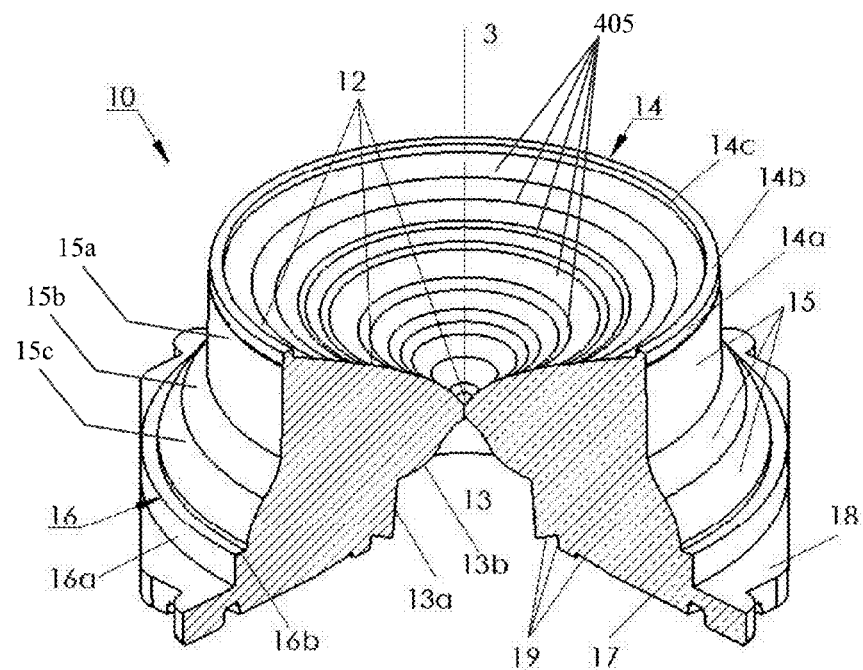
FIG. 4B illustrates a partially sectioned perspective view of the optical component illustrated in FIG. 4A.
Figure 4C:
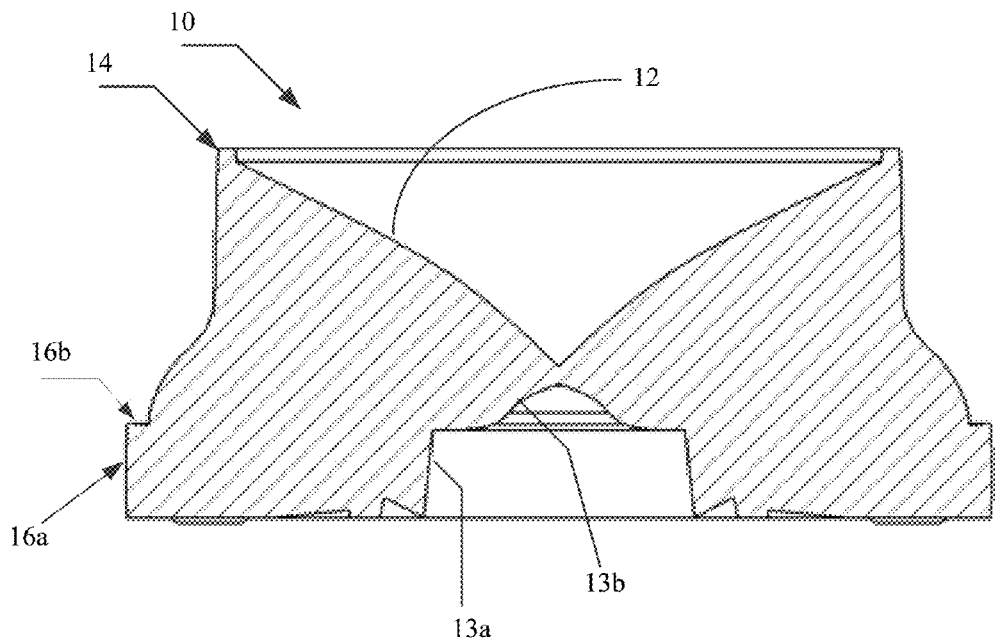
FIG. 4C illustrates a cross-sectional view of the optical component illustrated in FIG. 4A.
Figure 4D:
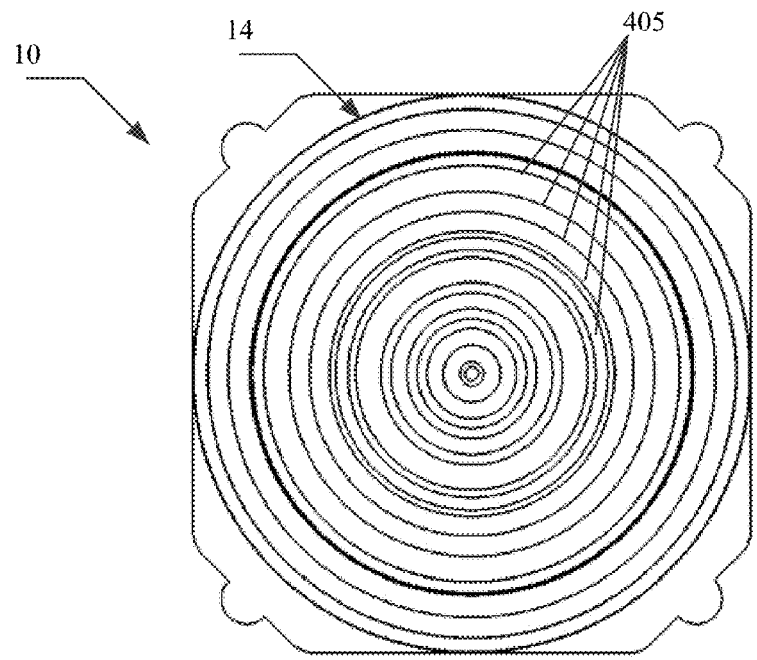
FIG. 4D illustrates a top-view of the optical component illustrated in FIG. 4A.

FIG. 4A illustrates a perspective view of an embodiment of an optical component 10 that can be disposed over a LED emitter and configured to spread light across an illumination panel. FIG. 4B illustrates a partially sectioned perspective view of the optical component illustrated in FIG. 4A. FIG. 4C illustrates a cross-sectional view of the optical component illustrated in FIG. 4A. FIG. 4D illustrates a top-view of the optical component illustrated in FIG. 4A. The illumination panel can be disposed at a distance between about 15-20 mm or less from the LED emitter. The optical component 10 can be configured to redistribute light emitted from the LED emitter uniformly across the illumination panel such that the distribution of light intensity across the illumination panel is smooth. The optical component 10 can be configured to spread light across the illumination panel such that the intensity of light across the illumination varies monotonically across the illumination panel without any intensity dips. The optical component can be configured to redistribute light emitted from the LED emitter across an illumination surface disposed at a distance between about 10-30 mm from the LED emitter such that the illuminance at a distance less than a threshold distance from a point where the central axis normal to the optical component intersects the illumination surface is greater than or equal to 75% (e.g., greater than or equal to about 80%, greater than or equal to about 85%, greater than or equal to about 90%, greater than or equal to about 95%, greater than or equal to about 99%) of the maximum illuminance on the illumination surface. In various implementations the threshold distance can have a value between about 5-30 mm. For example the threshold distance can be between about 5 mm and about 30 mm, between about 10 mm and about 25 mm, between about 15 mm and about 20 mm, between about 10 mm and about 30 mm, or values there between.

The optical component 10 comprises an inner cavity 13 bounded by inner surfaces 13a and 13b, a top surface 12, a side surface 15 and a base. The base of the optical component 10 includes a bottom surface 17 opposite the top surface 12. In various implementations, the bottom surface 17 can include one or more bottom structures 19. In various implementations, the base includes a flange and/or a rim 18 that extends outward from the outer side surface 15. The optical component 10 can further include one or more textured structures. For example, the one or more textured structures can include a textured top ring 14 disposed about the top surface 12. As another example, the one or more textured structures can include a textured side ring 16 disposed about the base or the side surface 15. The optical component 10 can be symmetric about a central axis 3 that is normal to the bottom surface 17 and passes through the top surface 12 and the inner cavity 13. The shape of a periphery of a cross-section of the top surface 12 in a plane perpendicular to the central axis 3 (e.g., as seen from the top) can be circular, oval or some other shape. In implementations of the optical component 10 having a top surface 12 wherein the shape of the periphery of the cross-section in a plane perpendicular to the central axis 3 is circular, the central axis 3 can pass through the center of the circular cross-section. In implementations of the optical component 10 having a top surface 12 wherein the shape of the periphery of the cross-section in a plane perpendicular to the central axis 3 is oval, the central axis 3 can pass through the center of the oval cross-section. In various implementations of the optical component 10, the central axis 3 can pass through the centroid of the optical component 10. In various implementations of the optical component 10, the central axis 3 can pass through a geometric center of the optical component 10. The optical component 10 can have a maximum height between about 5-10 mm (e.g., about 6 mm, about 7 mm, about 8 mm, about 9 mm). A maximum lateral extent of the optical component 10 from the central axis can be between about 6-10 mm (e.g., about 7 mm, about 8 mm, about 9 mm). In implementations of the optical component 10 having a top surface 12 with a circular cross-section in a plane perpendicular to the central axis, the maximum diameter of the top surface 12 can be between about 12-20 mm (e.g., 13 mm, 14 mm, 15 mm, 16 mm, 17 mm, 18 mm, 19 mm, 20 mm).

Top Surface of the Optical Component

Figure 4E:
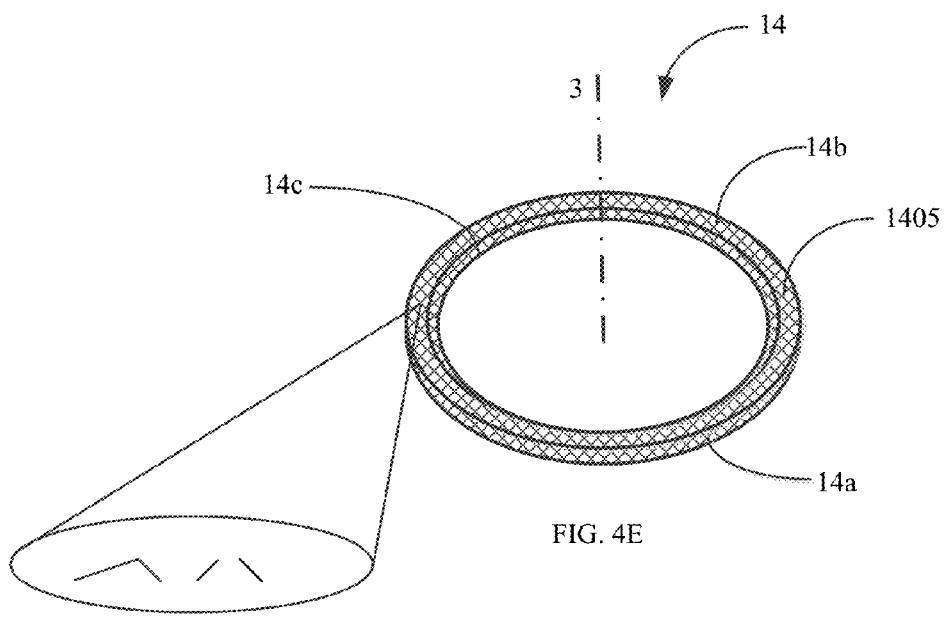
FIG. 4E illustrates a perspective view of a textured ring integrated with the optical component.
Figure 4F:
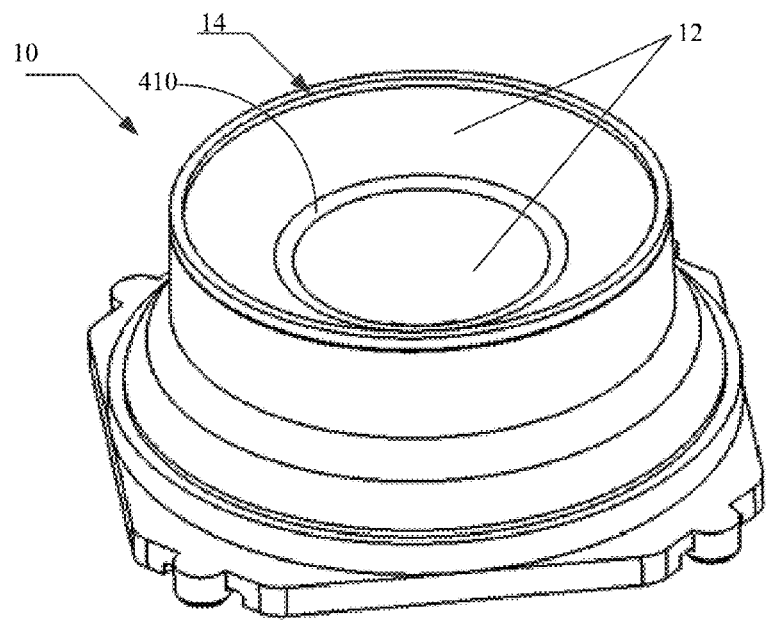
FIG. 4F illustrates a perspective view of another embodiment of an optical component configured to spread light across an illumination panel.
Figure 4G:
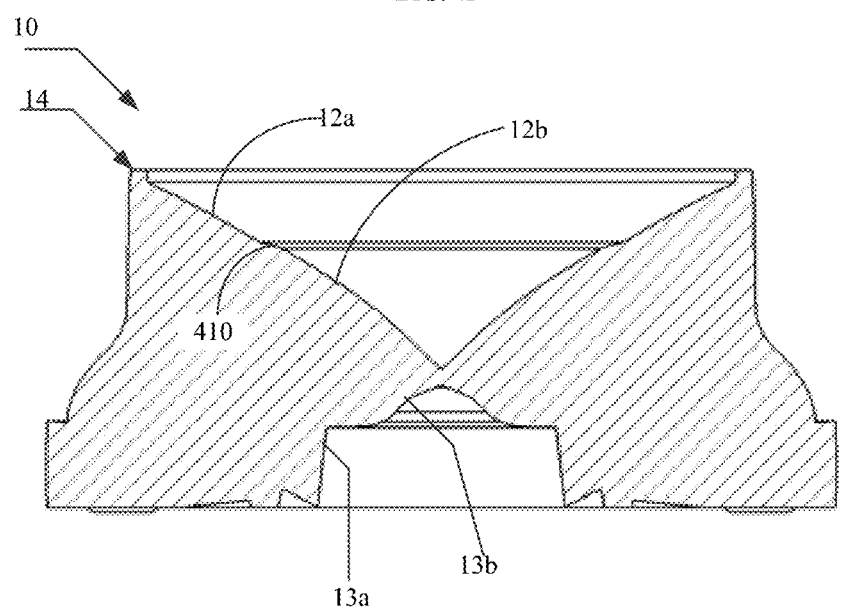
FIG. 4G illustrates a cross-sectional view of the optical component illustrated in FIG. 4F.

In various implementations, the top surface 12 can be planar or curved. In the illustrated implementations, the top surface 12 is curved and extends from a top of the side surface 15 towards the bottom surface 17. The top surface 12 is curved away from the side surface 15 towards the central axis 3. The top surface 12 can be considered to have a shape similar to a spiral funnel or a vortex. In the implementations illustrated in FIGS. 4A-4D, the curvature of the top surface 12 is continuous. It is noted that the circular lines 405 in FIGS. 4A, 4B and 4D are drawn to indicate the curvature of the top surface 12 do not represent discontinuities in the surface 12. However, in other implementations, the curvature top surface can be discontinuous, as shown in FIG. 4F which illustrates a perspective view of another embodiment of an optical component configured to spread light across an illumination panel. FIG. 4G illustrates a cross-sectional view of the optical component illustrated in FIG. 4F. As seen from FIG. 4G, the top surface 12 of the optical component illustrated in FIGS. 4F and 4G has a first curved surface 12a spaced apart from a second curved surface 12b by a region of discontinuity (or bend) 410. The curvatures of the first and the second curved surfaces 12a and 12b can be similar or different. In various implementations, a cross-sectional curvature of the top surface 12 in a plane parallel to the optical axis 3 can be concave, convex or an aspheric. In various implementations of the optical component 10, the top surface 12 is curved, the top surface 12 can be formed by a rotating a curved segment about the central axis 3. Accordingly, in such implementations, the top surface 12 is rotationally symmetric about the central axis 3. The central axis 3 can be normal to the surface of the LED emitter 11. In various implementations, the LED emitter 11 and/or the optical component 10 can be rotationally symmetric about the central axis 3.

A curvature of the top surface 12 can be configured such that light emitted from the LED emitter 11 at angles less than a first threshold angle with respect to the central axis 3 are directed out of the top surface 12 towards the illumination panel 113 while light emitted from the LED emitter 11 at angles greater than a second threshold angle directed towards the side surface 15 or towards the top ring structure 14. The first and the second threshold angles can depend on the nature of light emitted from the LED emitter 11, the refractive index of the material of the optical component 10. In various implementations, the first threshold angle can be between 0-20 degrees with respect to the central axis 3 and the second threshold angle can be between 10-60 degrees with respect to the central axis 3.

Side Surface of the Optical Component

The side surface 15 of the optical component 10 can be formed by rotating a curved segment around the central axis 3. In various implementations, the side surface 15 can be configured as a cylindrical surface disposed about the central axis 3. Accordingly, the side surface 15 is rotationally symmetric about the central axis 3. The side surface 15 can be curved about the central axis 3. In the illustrated implementation, the side surface 15 includes a first portion 15a that is configured as a cylindrical surface. The first portion 15a extends from the top ring structure 14 to the base. The portion of the cylindrical side surface 15a adjacent the base is circumscribed by a first curved surface 15b and a second curved surface 15c. The first and the second curved surfaces 15b and 15c can be curved along a radial direction such that they bulge outward from the optical component. In some embodiments, the side surface 15 may be configured to widen near the base and narrow near the periphery of the top surface 12. Accordingly, in such implementations, the shortest distance between the points on the portions 15b and 15c of the side surface 15 near the base and the central axis 3 may be greater than the shortest distance between the points on the portion 15a of the side surface 15 near the periphery of the top surface 12 and the central axis 3. Stated another way, the circumference of the side surface 15 near the base (e.g., circumference of the portions 15b and 15c of the side surface 15) can be larger than the circumference of the side surface 15 near the periphery of the top surface 12 (e.g., circumference of the portion 15a of the side surface 15). This can result in tangential lines to the side surface 15 near the base to have a larger angle with the central axis as compared to the angle between tangential lines to the side surface 15 near the periphery of the top surface 12 and the central axis 3.

Bottom Surface of the Optical Component

As discussed above, the optical component 10 includes a plurality of structures 19 formed on the bottom surface 17. The shape and position of the bottom structures 19 can depend on a variety of factors including but not limited to the shape and/or size of the inner cavity 13, the side surface 15 and the flange 18. In various implementations, the structure 19 can be partially or completely textured. Partial or complete texturing can be advantageous in reducing intensity hot spots at the center of light distribution profile. The structures 19 can provide other advantages as well. For example, the bottom structure 19 can help in recirculating light.

Inner Cavity of the Optical Component

As discussed above, the inner cavity 13 is bounded by an inner side surface 13a and an inner top surface 13b. In various implementations, the inner side surface 13a can be cylindrical. In various implementations, the inner top surface 13b can be an aspheric as illustrated in FIGS. 4B, 4C and 4G. The inner top and side surfaces 13a and 13b can be rotationally symmetric about the central axis 3. The inner cavity 13 can have a size and a shape such that when the optical component 10 is disposed over the LED emitter 11, the inner cavity envelopes the LED emitter 11 such that most of the light emitted from the LED emitter 11 is collected by the optical component 10. For example, in various implementations, the inner side surface 13a and the inner top surface 13b can be configured to collect between about 50% and about 99% of the light emitted from the LED emitter 11. The inner side surface 13a can be configured to collect and redirect light emitted from the LED emitter 11 at oblique angles towards the side surface 15. The inner top surface 13b can be configured to collect and redirect emitted from the LED emitter 11 at less oblique angles (i.e., light emitted along a direction closer to the central axis 3) towards the top surface 12. In various implementations, portions of the inner side surface 13a and inner top surface 13b can be textured by providing a plurality of microstructures. Partially or completely texturing the inner side surface 13a and inner top surface 13b can help in reducing color non-uniformity.

Textured Light Redistributing Surfaces of the Optical Component

In the illustrated implementation (e.g., FIGS. 4A and 4B), the textured top ring structure 14 has an inner side surface 14c, a top surface 14b, and an outer side surface 14a. FIG. 4E shows a perspective view of the textured ring 14 showing the inner side surface 14c, the top surface 14b, and the outer side surface 14a. The inner side surface 14c of the top ring structure 14 is disposed toward the curved side of the top surface 12 while the outer side surface 14a is disposed opposite the inner side surface 14c. In various implementations, the top ring structure 14 can be located at a distance of about 5 mm to about 10 mm from the bottom surface 18 of the optical component 10. In various implementations, the top ring structure 14 can be located at a distance of about 6 mm to about 10 mm from the central axis 3 of the optical component 10. A cross-section of the textured ring 14 in a plane parallel to the central axis 3 can be rectangular as shown in FIGS. 4B, 4C, 4G and 6. Alternately, a cross-section of the textured ring 14 in a plane parallel to the central axis 3 can be trapezoidal as illustrated in optical component 10b of FIG. 7 or semicircular as illustrated in optical component 10c of FIG. 7. In various implementations, the surfaces 14a, 14b, and 14c of the textured top ring structure 14 may be textured. Alternately in some embodiments only one or two of the surfaces 14a, 14b, and 14c may be textured. One, two or all the surfaces 14a, 14b and 14c can be textured by providing the plurality of microstructures 1405. The plurality of microstructures 1405 can include grooves, protrusions, facets having differential tangential planes as shown in the inset of FIG. 4E, surface or volume holograms, gratings, etc. In various implementations, the plurality of microstructures can be arranged randomly. However, in other implementations, the plurality of microstructures 1405 can be arranged to form a regular or an irregular pattern. The density of the plurality of microstructures disposed on one or more surfaces of the textured top ring structure 14 can be between $10/mm^2$ and $1000/mm^2$.

In various implementations, the density of the plurality of microstructures 1405 disposed on one or more surfaces of the textured top ring structure 14 can be between $10/mm^2$ and $30/mm^2$, between $20/mm^2$ and $50/mm^2$, between $25/mm^2$ and $100/mm^2$, between $40/mm^2$ and $75/mm^2$, between $50/mm^2$ and $100/mm^2$, between $75/mm^2$ and $200/mm^2$, between $125/mm^2$ and $250/mm^2$, between $150/mm^2$ and $300/mm^2$, between $200/mm^2$ and $400/mm^2$, between $250/mm^2$ and $500/mm^2$, between $300/mm^2$ and $450/mm^2$, between $500/mm^2$ and $750/mm^2$, between $550/mm^2$ and $800/mm^2$, between $600/mm^2$ and $700/mm^2$, between $750/mm^2$ and $850/mm^2$, between $800/mm^2$ and $1000/mm^2$, or values therebetween.

In various implementations, the plurality of microstructures 1405 can have a size such that an individual microstructure is not resolved by a normal human eye without the aid of magnification. Each of the plurality of microstructures 1405 can have a size in a range between 1 micron and about 100 microns. For example, in implementations where some of the plurality of microstructures 1405 include grooves, a depth (or height) of grooves can be in the range between about 1 micron and about 10 microns, between about 5 micron and about 20 micron, between about 10 microns and about 30 microns, between about 30 microns and about 50 microns, between about 40 microns and about 75 microns, between about 50 microns and about 80 microns, between about 75 microns and about 100 microns, or values therebetween.

As another example, in implementations where some of the plurality of microstructures 1405 include facets, a height of the facets can be in the range between about 1 micron and about 10 microns, between about 5 micron and about 20 micron, between about 10 microns and about 30 microns, between about 30 microns and about 50 microns, between about 40 microns and about 75 microns, between about 50 microns and about 80 microns, between about 75 microns and about 100 microns, or values therebetween.

For example, in implementations where some of the plurality of microstructures 1405 include gratings, a depth of the gratings and/or the distance between two consecutive gratings can be in the range between about 1 micron and about 10 microns, between about 5 micron and about 20 micron, between about 10 microns and about 30 microns, between about 30 microns and about 50 microns, between about 40 microns and about 75 microns, between about 50 microns and about 80 microns, between about 75 microns and about 100 microns, or values therebetween.

The plurality of microstructures 1405 on one or more surfaces of the textured top ring structure 14 can scatter and/or diffuse light emitted from the LED emitter 11 and redirected by the surfaces of the inner cavity 13. In various implementations, the textured top ring structure 14 can be disposed at the periphery of the top surface 12 such that it forms a boundary between the top surface 12 and the side surface 15. The position of the textured top ring structure 14 and the density and arrangement of the microstructures 1405 can be configured such that light emitted from the LED emitter 11 and redirected by the surfaces of the inner cavity 13 is uniformly and/or monotonically distributed across an illumination surface disposed at a distance between about 10-30 mm (e.g., 10-15 mm, 15-18 mm, 15-20 mm, 13-20 mm, 15-25 mm, or values therebetween) from the LED emitter 11 without any dips or dark regions. The position of the textured top ring structure 14 and the density and arrangement of the microstructures 1405 can be configured such that, the illuminance across the illumination surface disposed at a distance between about 10-30 mm (e.g., 10-15 mm, 15-18 mm, 15-20 mm, 13-20 mm, 15-25 mm, or values therebetween) from the LED emitter 11 varies smoothly (or monotonically) about the central axis 3. For example, the illuminance across an illumination surface disposed at a distance between about 10-30 mm from the LED emitter 11 at a distance less than a threshold distance from the central axis 3 can be greater than or equal to 75% (e.g., greater than or equal to about 80%, greater than or equal to about 85%, greater than or equal to about 90%, greater than or equal to about 95%, greater than or equal to about 99%) of the maximum illuminance on the illumination surface. In various implementations the threshold distance can have a value between about 5-30 mm. For example the threshold distance can be between about 5 mm and about 30 mm, between about 10 mm and about 25 mm, between about 15 mm and about 20 mm, between about 10 mm and about 30 mm, or values there between.

The textured side ring structure 16 has a top surface 16b and a side surface 16a. A normal to the top surface 16b of the textured side ring structure 16 is parallel to or forms a small angle with the central axis 3, while a normal to the side surface 16a can be parallel to or forms a small angle with respect to a horizontal axis perpendicular to the central axis 3. In various implementations, the side ring structure 16 can be located at a distance of about 0.5 mm to about 2 mm from the bottom surface 18 of the optical component 10. In various implementations, the side ring structure 16 can be located at a distance of about 6 mm to about 10 mm from the central axis 3 of the optical component 10. One or both the top surface 16b and the side surface 16a can be textured. As discussed above, one or more surfaces of the side ring structure 16 can be textured by providing a plurality of microstructures. The plurality of microstructures can include grooves, protrusions, facets, surface or volume holograms, gratings, etc. In various implementations, the plurality of microstructures can be arranged randomly. However, in other implementations, the plurality of microstructures can be arranged to form a regular or an irregular pattern. The density of the plurality of microstructures disposed on the surfaces of the textured side ring structure 16 can be between 10/mm² and 1000/mm². The ranges of the size and density of the microstructures disposed on the surfaces of the textured side ring structure 16 can be similar to the ranges provided above.

Similar to the top ring structure 14, the plurality of microstructures on one or more surfaces of the textured side ring structure 16 can also scatter and/or diffuse light emitted from the LED emitter 11 and redirected by the surfaces of the inner cavity 13. In various implementations, the textured side ring structure 16 can be disposed at the base of the side surface 15 and can be adjacent the flange 18. The position of the textured side ring structure 16 and the density and arrangement of the microstructures can be configured such that light emitted from the LED emitter 11 and redirected by the surfaces of the inner cavity 13 is uniformly and/or monotonically distributed across an illumination surface disposed at a distance between about 10-30 mm (e.g., 10-15 mm, 15-18 mm, 15-20 mm, 13-20 mm, 15-25 mm, or values therebetween) from the LED emitter 11 without any dips or dark regions. The position of the textured side ring structure 16 and the density and arrangement of the microstructures can be configured such that, the illuminance across the illumination surface disposed at a distance between about 10-30 mm (e.g., 10-15 mm, 15-18 mm, 15-20 mm, 13-20 mm, 15-25 mm, or values therebetween) from the LED emitter 11 varies smoothly (or monotonically) about the central axis 3. For example, the illuminance across an illumination surface disposed at a distance between about 10-30 mm from the LED emitter 11 at a distance less than a threshold distance from the central axis 3 can be greater than or equal to 75% (e.g., greater than or equal to about 80%, greater than or equal to about 85%, greater than or equal to about 90%, greater than or equal to about 95%, greater than or equal to about 99%) of the maximum illuminance on the illumination surface. In various implementations the threshold distance can have a value between about 5-30 mm. For example the threshold distance can be between about 5 mm and about 30 mm, between about 10 mm and about 25 mm, between about 15 mm and about 20 mm, between about 10 mm and about 30 mm, or values there between.

Figure 5:
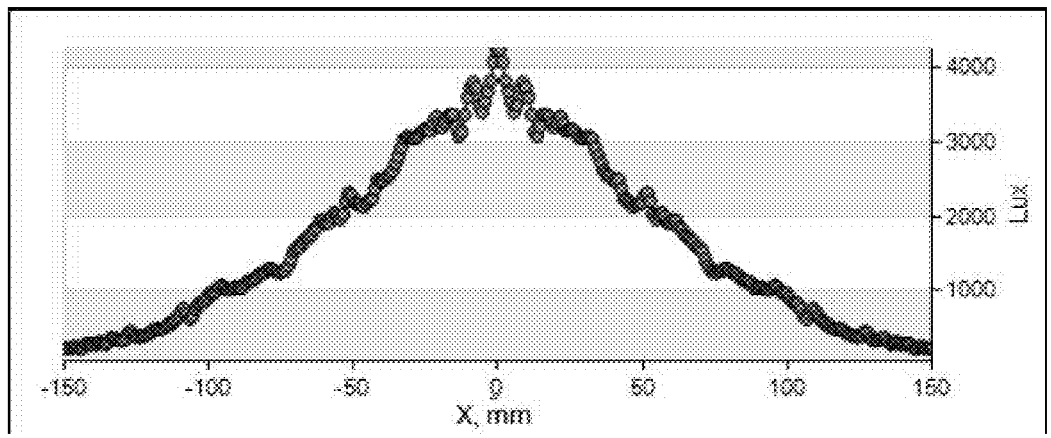
FIG. 5 shows the illuminance (or luminous flux incident per unit area of an illumination surface) achieved by the optical component across an illumination surface disposed at the distance from the LED emitter.

Distribution of Light Across an Illumination Panel at the Output of the Optical Component FIG. 5 shows illuminance (or luminous flux incident per unit area of an illumination surface) from a single LED emitter 11 over an illumination surface 113 disposed at a distance from the LED when the optical component 10 is disposed over the single LED emitter 11. As noted from FIG. 5 the illuminance profile is distributed about a reference point (designated as '0') that corresponds to the point where the central axis 3 intersects the illumination surface 113. The illumination surface 113 can be disposed at a distance between about 10-30 mm (e.g., 10-15 mm, 15-18 mm, 15-20 mm, 13-20 mm, 15-25 mm, or values therebetween) or less from the LED emitter 11. It is observed from FIG. 5 that the peak of the illuminance is along a direction that coincides with the central axis 3. The illuminance at a distance less than or equal to about 25 mm from the reference point (or a point where the central axis 3 intersects the illumination surface) is greater than or equal to about 75% of the maximum illuminance and the illuminance at a distance between about 25 mm and about 60 mm from the central axis 3 is between about 50-80% of the maximum illuminance.

The illuminance profile includes several peaks and valleys indicating that the illuminance at a distance, d, from the reference point can be greater than or lesser than the illuminance at another distance d±Δd in its vicinity. However, the maximum variation in the illuminance in a region located between a distance (d−Δd) from the reference point and (d+Δd) from the central axis 3 is less than 10% of the maximum illuminance in that region, where d can have a value between 1-100 mm and Δd can have a value between 0.5-25 mm. This is in contrast to the illuminance profile illustrated in FIG. 3 which shows that the maximum variation in the illuminance in a region located at a distance between 5-25 mm or between 20-40 mm from the reference point is greater than 20% of the maximum illuminance in those regions. Accordingly, the illuminance profile illustrated in FIG. 5 can be considered to gradually decrease as the distance from the reference point increases which corresponds to an increase in the angle between the direction along which light is emitted and the central axis 3. In fact, contrary to the illuminance profile illustrated in FIG. 3, the illuminance profile illustrated in FIG. 5 does not exhibit large variations in the illuminance value in a region around the reference point. As such, the light can be considered to be uniformly distributed across the illumination surface 113 by the optical component 10. In various implementations, the illuminance can decrease monotonically as the distance from the reference point increases. Thus, the optical component 10 illustrated in FIGS. 4A, 4B, 4C, 4D, 4F and 4G can advantageously reduce the occurrence of dark regions or large variations in the intensity in the illumination pattern generated by the LED emitter.

Figure 6:
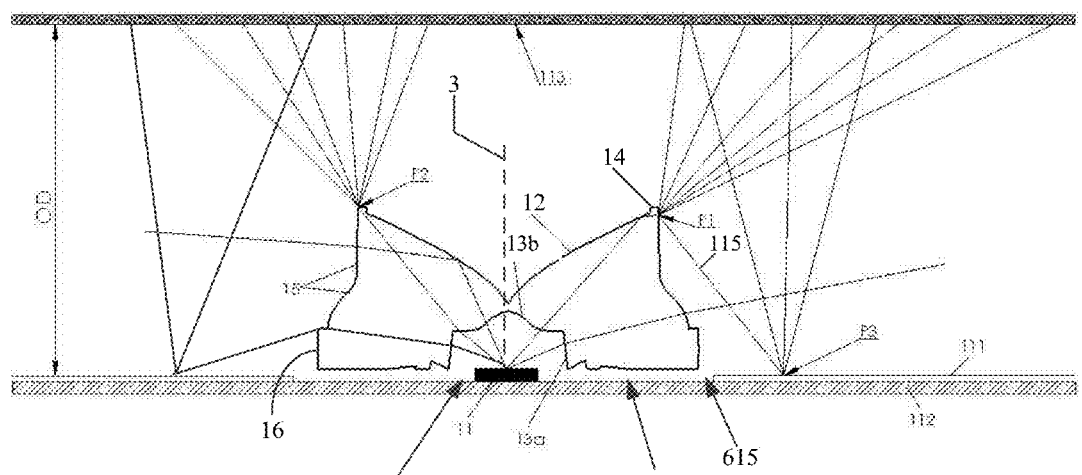
FIG. 6 is a cross sectional view of an illumination device including an LED emitter and the optical component according to an embodiment.

The light spreading mechanism of the optical component 10 illustrated in FIG. 4A is explained with reference to FIG. 6. FIG. 6 is a cross sectional view of an illumination device including an LED emitter 11 and the optical component 10 configured to illuminate the surface 113. As discussed above, the optical component 10 is configured to spread light uniformly across the surface 113 such that the distribution of light intensity across the surface 113 is smooth. The optical component 10 is configured to spread light across the surface 113 such that the intensity of light across the illumination varies monotonically across the surface 113 without any intensity dips. In the implementation illustrated in FIG. 6, the LED emitter 11 is mounted on a PCB 112. The optical component 10 is disposed over the LED emitter 11. The surface of the PCB 112 on which the LED emitter 11 is disposed can be reflective. The surface of the PCB 112 can be configured to be reflective by integrating a reflector with the surface of the PCB 112 on which the LED emitter 11 is disposed, by coating the surface of the PCB 112 on which the LED emitter 11 is disposed with a high reflection coating or other methods. In various implementations, the reflectivity of the surface of the PCB 112 can be uniform across the surface of the PCB 112. However, in some implementations the reflectivity can vary across the surface of the PCB 112. For example, in some implementations, the reflectivity of the surface of the PCB 112 between the LED emitter 11 and the optical component 10 in the region 605 can be different from the reflectivity of the surface of the PCB 112 in the region 610 that is adjacent the bottom surface 17 of the optical component 10. The reflectivity of the surface of the PCB 112 in the regions 605 and 610 can be different from the reflectivity of the surface of the PCB 112 in the region 615 that is external to the optical component 10. In various implementations, the reflectivity in the region 605 can be lower than the reflectivity in the region 610 and/or region 615. In various implementations, the reflectivity in the region 610 can be lower than the reflectivity in the region 615. The reflectivity in the regions 605, 610 and 615 can be selected to reduce intensity peaks and/or dips in the central region and spread the light output from the optical component 10 uniformly across the illumination surface. The reflectivity of the regions 605, 610 and 615 can vary between 30-100%.

Light emitted from the LED emitter 11 in a first angular extent $\Delta\theta_1$ with respect to the central axis 3 is output from the optical component 10 towards the illumination panel 113 through the top surface 12. Light emitted from the LED emitter 11 in a second angular extent $\Delta\theta_2$ with respect to the central axis 3 is incident on the textured top ring structure 14 and redirected towards the illumination panel 113. A portion of the light emitted from the LED emitter 11 incident on the top ring structure 14 can be directed towards the PCB 112. By providing a light redirecting element 111 on the PCB, the light directed towards the PCB 112 can be redirected towards the illumination panel 113. Light emitted from the LED emitter 11 in a fourth angular extent $\Delta\theta_4$ with respect to the central axis 3 is incident on the textured side ring structure 16 (e.g., the top surface 16b or the side surface 16a) and directed towards the PCB 112. This portion of the light can also be redirected towards the illumination panel 113 by the redirecting element 111. In various implementations, the first angular extent $\Delta\theta_1$ can be between 0-20 degrees, the second angular extent $\Delta\theta_2$ can be between 10-70 degrees, the third angular extent $\Delta\theta_3$ can be between 10-60 degrees and the fourth angular extent $\Delta\theta_4$ can be between 50-150 degrees with respect to the central axis 3.

As discussed above, the illumination panel 113 can be disposed at a distance less than 30 mm (e.g., less than 25 mm, less than 20 mm, between about 13-20 mm, between about 15-18 mm, between about 8-13 mm, etc.) from the LED emitter 11. As discussed above, the inner cavity 13 of the optical component 10 envelopes the LED emitter 11 such that most of the light emitted by the LED emitter 11 is incident on the inner surfaces 13a and 13b of the inner cavity 13. In various implementations, a normal to the inner side surface 13a can be perpendicular or almost perpendicular to the central axis 3 such that the inner side surface 13a is aligned parallel to the central axis 3 (or along the vertical direction). Light emitted from the LED emitter 11 at oblique angles (e.g., greater than 45 degrees) with respect to the central axis 3 is incident on the inner side surface 13a and bent due to refraction such that it is almost perpendicular to the central axis 3 and is directed towards the portion of the side surface 15 adjacent the base of the optical element 10, as shown in FIG. 6 from where it is extracted out of the optical component 10 at a large angle with respect to the central axis 3 to illuminate the panel 113. The inner top surface 13b is sized and shaped to direct light emitted from the LED emitter 11 at small angles (e.g., less than 45 degrees) with respect to the central axis 3 toward the top surface 12. For example, light incident on the peripheral portions of the inner top surface 13b is refracted such that it is incident on the periphery of the top surface 12, as shown in FIG. 6, while light incident on the central portions of the inner top surface 13b is refracted such that it is incident on the central portion of the top surface 12, as shown in FIG. 6 and subsequently bent such that it propagates along a direction that is almost perpendicular to the central axis 3 and exits the optical component 10 through the side surface 15.

Figure 3:
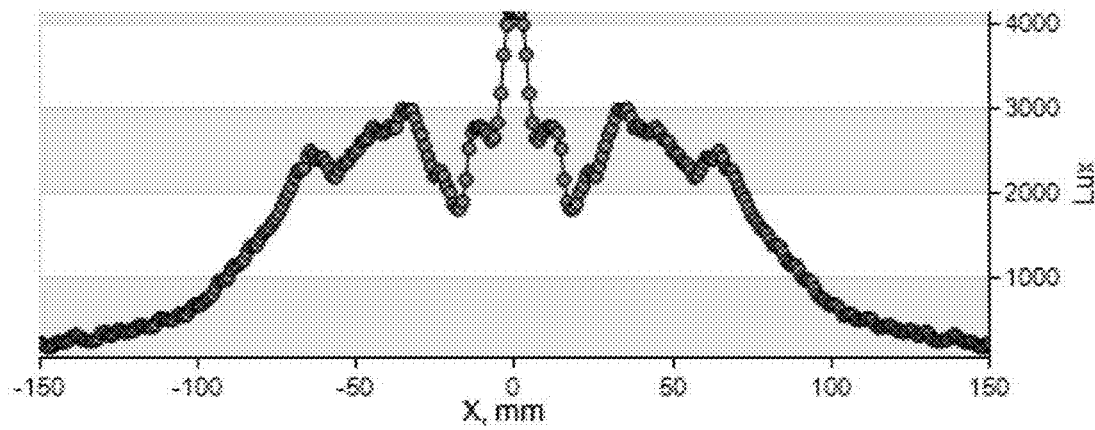
FIG. 3 illustrates the illuminance (or luminous flux incident per unit area of an illumination surface) achieved by the optical component illustrated in FIG. 2 over an illumination panel disposed at a distance from the LED.

As the optical distance (OD) between the LED emitter 11 and the surface 113 becomes smaller, light incident on the peripheral portion of the top surface 12 could be refracted out of the optical component 10 such that the illuminance across the illumination panel has dips, as shown in FIG. 3, which can result in formation of a dark annular region in the illuminance profile. The dark annular region can have an angular extent $\Delta\theta_{dark}$. In various implementations, the angular extent $\Delta\theta_{dark}$ of the angular region can vary between 20 and 60 degrees. However, as discussed above, the textured top ring structure 14 disposed at the periphery of the top surface 12 can scatter and/or diffuse light incident on the periphery of the top surface 12 in the dark annular region such that dips in the illuminance profile are filled. Thus, light incident on the point P2 of the peripheral portion of the top surface 12 corresponding to the top surface 14b and/or the inner side surface 14c of the ring 14 is diffused by the one or more textured surfaces of the top ring structure 14 in an annular region disposed along the vertical direction parallel to the central axis 3, as shown in FIG. 6. The annular region can correspond to the dark ring having an angular extent $\Delta\theta_{dark}$. As discussed above, light incident at large angles with respect to the central axis 3 can be incident on the top surface 16b or the side surface 16a of the textured side ring structure 16 and be redirected towards the PCB 112. This light can also be directed towards the illumination panel 113 by adjusting the reflectivity of the surface of the PCB 112 or by providing a reflector (e.g., a light redirecting element 111 described below).

As another example, light incident on the point P1 of the peripheral portion of the top surface 12 corresponding to the outer side surface 14a the ring 14 is diffused in an angular region disposed about the horizontal direction perpendicular to the central axis 3, as shown in FIG. 6. In various implementations, some of the light incident on the point P1 could be diffused and/or scattered such that it propagates along a direction toward the PCB 112 and away from the illumination panel 113, as shown by ray 115 in FIG. 6. In such implementations, a light redirecting element 111 can be disposed on the PCB 112 such that light incident on point P3 of the light redirecting element 111 is redirected toward the surface 113. In various implementations, the light redirecting element 111 can be a specular reflector, a diffused reflector and/or a scattering element. In various elements, the light redirecting element 111 can include a plurality of light turning features (e.g., microstructures, facets, holographic features, etc.) that are configured to further redirect incident light toward the surface 113. In various implementations, the light redirecting element 111 can be configured to further scatter or diffuse the incident light such that the radiation pattern across the surface 113 is uniform and/or monotonic.

As discussed above, the density of the plurality of microstructures on the one or more textured surfaces of the top ring structure 14 and/or side ring structure 16 can be configured to achieve a desired radiation pattern. Similarly, the size of the plurality of microstructures on the one or more textured surfaces of the top ring structure 14 and/or side ring structure 16 and/or the dimensions of the one or more surfaces of the top ring structure 14 and/or side ring structure 16 can be configured to achieve a desired radiation pattern. For example, the size of the microstructures, the density of the microstructures and/or the dimensions of the one or more surfaces of the top ring structure 14 and/or side ring structure 16 can be configured such that the distribution of light intensity across the illumination panel 113 is uniform, monotonic, Gaussian, Lambertian or some other type. In various implementations, the top surface 14b and the inner side surface 14c of the top ring structure 14 can be configured to redirect light in an area along the vertical direction. In various implementations, the outer side surface 14a of the top ring structure 14 can be configured to redirect light in an area along the horizontal direction. In various implementations, the area in which the top surface 14b and the inner side surface 14c of the top ring structure 14 redirect light may be smaller than the area in which the side surface 14a is configured to redirect light.

Although, the implementation illustrated in FIG. 6 is described for use when the optical distance between the LED emitter 11 and the illumination panel 113 is less than 25 mm (e.g., 15-20 mm or less), the size of the microstructures, the density of the microstructures and/or the dimensions of the one or more surfaces of the top ring structure 14 and/or side ring structure 16 can be configured such that the distribution of light intensity across the illumination panel is uniform and/or monotonic when the optical distance between the LED emitter 11 and the illumination panel 113 is greater than or equal to 25 mm. In various implementations, the reflectivity of the PCB 112 and/or the light redirecting element 111 can be adjusted to cancel/reduce the effect of the changing the optical distance to values greater than or equal to about 25 mm to achieve uniform and/or monotonic light intensity distribution. In various implementations, the change in the reflectivity of the PCB 112 can be adjusted in combination with adjusting the size of the microstructures, the density of the microstructures and/or the dimensions of the one or more surfaces of the top ring structure 14 and/or side ring structure 16 to reduce the intensity hot/dark spot at the center of the light distribution by directing more light that is incident on the board 112 toward the ring structure 14.

Figure 7:
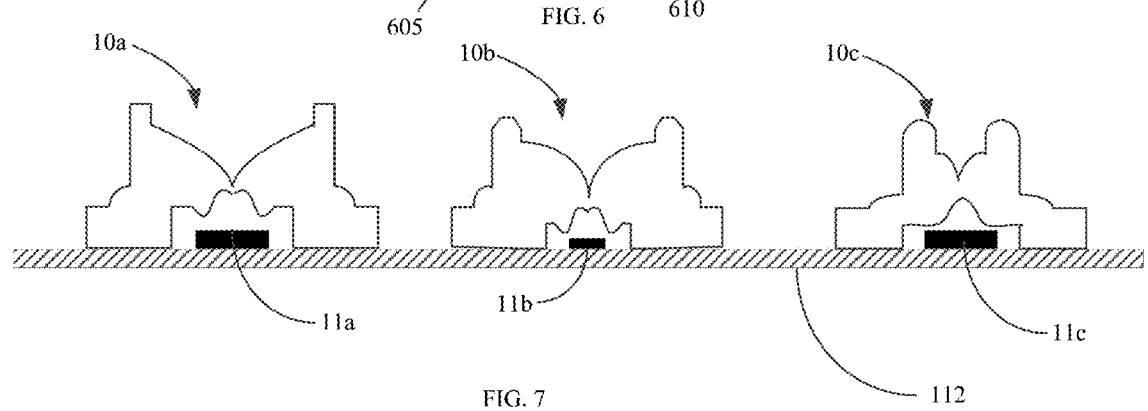
FIG. 7 illustrates a cross sectional view of a light bar according to an embodiment, including a plurality of LED emitters and optical components disposed over the plurality of LED emitters.

The implementation illustrated in FIG. 6 could be configured for use in a backlight or a panel light. For example, the PCB 112 can include an array of LED emitters 11a, 11b and 11c, each of LED emitter of the array associated with a corresponding optical component 10a-10c, as shown in FIG. 7.

Reduction of Color Non-Uniformity at the Output of the Optical Component

As discussed above, embodiment of a WLED emitter can have color non-uniformity on the emitting surface or in the vicinity of the WLED emitter. The color non-uniformity can be referred to spatial color non-uniformity and/or near-field angular color non-uniformity. The color non-uniformity in WLED emitter can result in the light extracted from the optical component 10 to have color non-uniformity as well. For example, light extracted from the optical component 10 and incident on the surface 113 can exhibit rapid change in color that results in rings of different colors and/or gradual change in color which can cause the average color temperature of a central illumination region to be different from the average color temperature of the WLED emitter.

In order to reduce the color non-uniformity, the side surface 15 could be partially or completely configured to diffuse light. For example, a portion of the side surface 15 could be configured to diffuse light. The diffusing function can be introduced in any portion of the side surface 15. For example, the portion of the side surface 15 close to the periphery of the top surface 12, the portion of the side surface 15 toward the base of the optical component 10 and/or portions in the middle of the side surface 15 can be configured to diffuse light. In various implementations, a plurality of microstructures could be incorporated in the portions of the side surface 15 that are configured to be diffusing.

Although, as illustrated in FIG. 4A, the top surface 12 appears to have a plurality of rings, the rings indicate a depth profile of the top surface 12. In the embodiment illustrated in FIG. 4A, the top surface 12 has a smooth curvature from the periphery to the center. Accordingly, the top surface 12 can be considered to be a continuous curve characterized by a gradual or a smooth change in the angle of a tangent to the curve with respect to the central axis 3 as the curve is traced downwards. However, in some embodiments, the top surface 12 can have a ring step characterized by a relatively large change in the angle of a tangential line a tangent to the curve with respect to the central axis 3 as the curve is traced downwards. The position of the ring step can depends on the color distribution on the top surface 12. The presence of the ring step can cause light of color that is different from the average color of the LED emitter 11 to be directed toward the light redirecting element 111 so that it can diffuse outward.

Although, the embodiment illustrated in FIG. 4A, illustrates that the top ring structure 14 comprises an inner side surface 14c, an outer side surface 14a and a top surface 14a, in various implementations, the inner side surface 14c be integrated with the top surface 12 such that the top ring structure 14 comprises only the outer side surface 14a and the top surface 14b.

Second Implementation of the Light Spreading Optical Component

Figure 8:
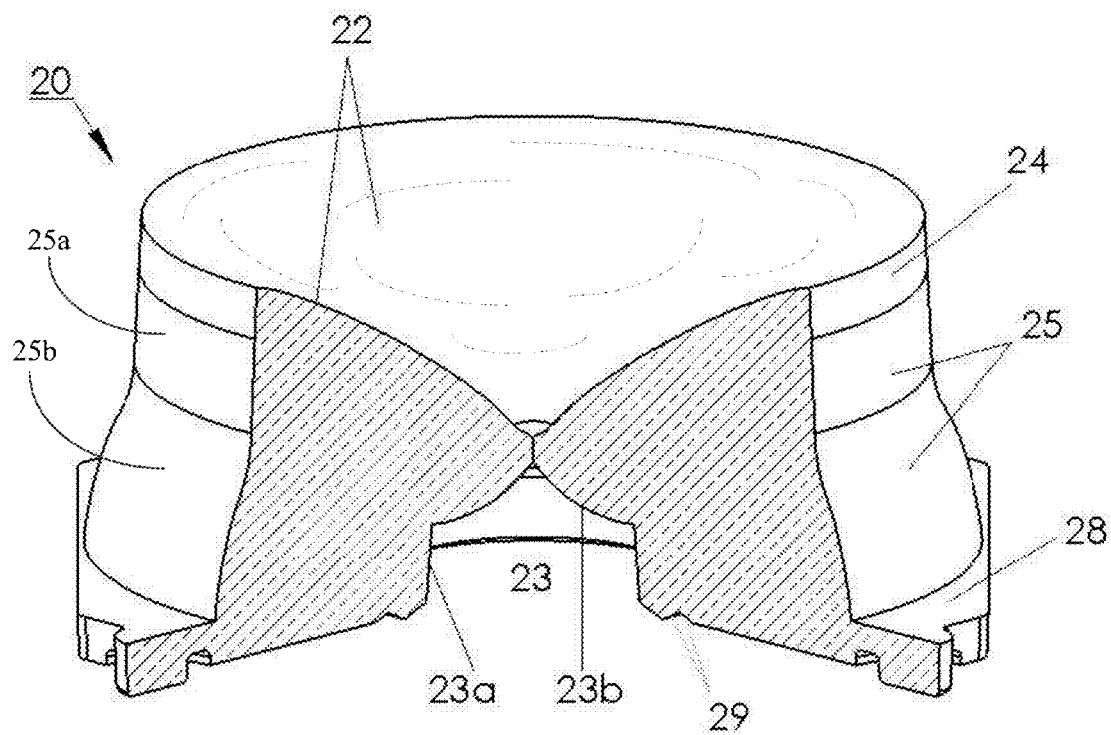
FIG. 8 is a partially sectioned perspective view of another embodiment of an optical component configured to spread light across an illumination panel.

FIG. 8 is a partially sectioned isometric view of another embodiment of an optical component 20 configured to illuminate a surface. Similar to the optical component 10, the optical component 20 is also configured to spread light uniformly across the surface such that the distribution of light intensity across the surface is smooth. The optical component 20 is configured to spread light across the surface such that the intensity of light across the illumination varies monotonically across the surface without any intensity dips. The optical component 20 comprises an inner cavity 23 bounded by an inner side surface 23a and an inner top surface 23b. The optical component 20 includes a curved top surface 22. In various implementations, the top surface 22 can be convex, concave or aspheric. A diffusing surface 24 configured to diffuse light can be disposed around the periphery of the top surface 22. A side surface 25 can extend downward from the periphery of the top surface 22 to the base of the optical component 20. A portion of the base of the optical component 20 can be configured as a protrusive flange 28 that extends outward from the side surface 25. One or more structures 29 can be disposed on a bottom surface of the optical component 20. In various implementations, the side surface 25 can be wider near the flange 28 and taper toward the peripheral portion 24. In the illustrated implementation, a portion of the side surface 25 is configured as a cylindrical surface referenced by the numeral 25a and another portion referenced by the numeral 25b is configured to curve in a radial direction.

In various implementations, the diffusing surface 24 can be disposed in the middle of the side surface 25 such that the side surface 25 is divided into a first region that connects to the periphery of the top surface 22 and a second region that extends to the flange 28. Other variations are also possible.

CONCLUSION

The implementations of optical components 10, 10a, 10b, 10c, and 20 described herein can comprise materials that are transparent or transmissive to wavelengths in UV, visible and/or IR spectrum. For example, the optical components 10 and 20 can comprise materials including but not limited to inorganic glass, organic glass, optical grade polymer or composite materials. The inner cavity 13 and 23 of the optical components 10 and 20 can include a material having a refractive index that is lower than the refractive index of the material of the optical components 10 and 20. For example, in various implementations, the inner cavity 13 and 23 can include air, nitrogen, argon, xenon or some other gas. In various implementations, the optical components 10 and 20 can be fabricated as a monolithic structure. In various implementations, the top ring structure 14, the side ring structure 16 and/or the diffusing surface 24 can be integrated with other surfaces of the optical components 10, 10a, 10b, 10c, and 20. The optical components 10 and 20 can be manufactured using known manufacturing methods including but not limited to glass turning, glass blowing, molding, casting and embossing, 3D printing, etc. Various implementations, of optical components 10, 10a, 10b, 10c, and 20 can be fabricated as a unitary or a monolithic structure. For example, optical components 10, 10a, 10b, 10c, and 20 can be fabricated by inserting optical grade material into a mold.

The plurality of microstructures can be disposed on the various surfaces of the optical components 10, 10a, 10b, 10c, and 20 using methods, such as, for example, patterning, etching, photolithography, 3D printing, embossing, machining, etc. In those implementations of optical components 10, 10a, 10b, 10c, and 20 that are manufactured using a molding method, metal or other particles can be disposed on those surfaces of the mold that correspond to the surfaces of the optical components 10, 10a, 10b, 10c, and 20 that are textured such that during the molding process, a texture is imparted to the optical grade material that comes in contact with the surfaces of the mold including metal or other particles.

References throughout this specification to "one embodiment," "an embodiment," "a related embodiment," "an implementation," or similar language mean that a particular feature, structure, or characteristic described in connection with the referred to "embodiment" or "implementation," is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In the drawings like numbers are used to represent the same or similar elements wherever possible. The depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

The features recited in claims appended to this disclosure are intended to be assessed in light of the disclosure as a whole.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An optical apparatus for use with a light source comprising at least one light emitting diode (LED), the apparatus comprising:
    a single-piece, light-transmitting body comprising a top, a bottom and a side interconnecting the top and the bottom, wherein an imaginary central axis of the body passes through the top and the bottom and does not pass through the side;
    at least one top curved surface formed on the top of the body;
    a bottom cavity formed into the body in a central portion of the bottom such that the central axis passes through the bottom cavity, wherein the bottom cavity is arranged relative to the light source such that the light source is placed under the bottom cavity and the central axis passes through the light source along with the top and bottom cavity; and
    a top textured surface formed along a periphery of the at least one top curved surface when viewed from the top along the central axis, the top textured surface comprising microstructures configured to diffuse light beams incident thereto from within the body,
    wherein the at least one top curved surface is recessed relative to the top textured surface while the at least one top curved surface is convexed in a cross section taken along a plane parallel to the central axis.

2. The apparatus of claim 1, wherein the top textured surface is generally raised with reference to the at least one top curved surface, wherein the at least one top curved surface does not comprise microstructures configured to diffuse light beams that are incident thereto from within the body.

3. The apparatus of claim 1, further comprising a side textured surface formed on the side immediately next to the top textured surface and comprising microstructures configured to diffuse light beams incident thereto from within the body.

4. The apparatus of claim 3, wherein the top textured surface and the side textured surface are configured to have a distinct boundary therebetween or continuously formed without a distinct boundary therebetween, wherein when not considering the microstructures, the top textured surface comprises a portion generally facing away from the bottom cavity in a direction along the central axis, wherein when not considering the microstructures, the side textured surface comprises a portion generally facing away from the bottom cavity in radial directions from the central axis.

5. The apparatus of claim 4, wherein the side textured surface immediately next to the top textured surface is referred to as a first side textured surface, wherein the apparatus further comprises a second side textured surface formed on the side that is separated from the first side textured surface with a non-textured surface that does not comprise microstructures for diffusing light beams incident thereto from within the body.

6. The apparatus of claim 4, wherein the height of the body is from about 5 mm to about 10 mm, wherein the top textured surface is located at a distance in a radial direction from the central axis from about 6 mm to about 10 mm.

7. An illumination device comprising:
    the apparatus of claim 6; and
    a light source comprising at least one light emitting diode (LED),
    wherein the light source is arranged relative to the apparatus such that the central axis passes through the light source and light beams emitted from the light source are at least in part directed to the bottom cavity without reflection before reaching the bottom cavity.

8. The device of claim 7, wherein the illumination device has illumination characteristics that at an optical distance in a range of 10-30 mm, illuminance within a distance of 25 mm from the central axis is equal to or greater than 75% of the maximum illuminance.

9. An illumination system comprising:
    a plurality of illumination devices comprising the illumination device of claim 8, wherein the plurality of illumination devices are aligned to form a linear arrangement or an array.

10. A back lighting unit of an LCD display panel comprising the illumination system of claim 9.

11. An LCD display panel comprising the back lighting unit of claim 10.

12. A consumer electronic device comprising an LCD display panel of claim 11.

13. The device of claim 7, wherein the illumination device has illumination characteristics that at an optical distance in a range of 10-30 mm, illuminance within a distance of 50 mm from the central axis is not less than 50% of the maximum illuminance.

14. The apparatus of claim 3, wherein the side textured surface immediately next to the top textured surface is referred to as a first side textured surface, wherein the apparatus further comprises a second side textured surface formed on the side that is separated from the first side textured surface with a non-textured surface that does not comprise microstructures for diffusing light beams incident thereto from within the body.

15. The apparatus of claim 14, wherein the second side textured surface comprises a portion generally facing away from the bottom cavity in a direction along the central axis, wherein when not considering the microstructures, the side textured surface comprises a portion generally facing away from the bottom cavity in radial directions from the central axis.

16. The apparatus of claim 1, wherein the at least one top curved surface is curved such that its curvature is generally radially symmetrical about the central axis, wherein the top textured surface surrounds the at least one top curved surface when viewed from the top along the central axis, wherein the microstructures of the top textured surface are configured to direct incident light beams from within the body to directions that would not be possible if the top textured surface was flat or curved without the microstructures.

17. The apparatus of claim 1, wherein the microstructures of the top textured surface comprise a first microstructure that provides a plurality of micro-surfaces having different tangential planes, which allows two or more parallel light beams incident to the first microstructure to reach different micro-surfaces that would let the two or more parallel light beams leave the first microstructure in different directions, wherein all or part of the plurality of micro-surfaces are continuously curved with or discretely separated from their immediately neighboring micro-surfaces.

18. The apparatus of claim 1, wherein the at least one top curved surface is curved such that a substantial portion of light beams from the light source that are received through the bottom cavity and incident to the at least one top curved surface without any prior reflection inside the body is subject to total internal reflection on the at least one top curved surface.

19. The apparatus of claim 1, wherein when the light source is placed under the bottom cavity and the central axis passes through the light source along with the top and bottom cavity, the apparatus is configured to provide illumination characteristics that at an optical distance in a range of 10-30 mm, illuminance via the apparatus within a distance of 25 mm from the central axis is equal to or greater than 75% of the maximum illuminance.

20. The apparatus of claim 1, wherein when the light source is placed under the bottom cavity and the central axis passes through the light source along with the top and bottom cavity, the apparatus is configured to provide illumination characteristics that at an optical distance in a range of 10-30 mm, illuminance within a distance of 50 mm from the central axis is not less than 50% of the maximum illuminance.

* * * * *